June 6, 1944. R. N. BEAN ET AL 2,350,867
SEALING AND TESTING WELL HEAD CONNECTIONS
Filed May 9, 1939 2 Sheets-Sheet 1

R.N. BEAN.
J.S. ABERCROMBIE
HERBERT ALLEN
Jesse R. Stone
Lester B. Clark
INVENTORS
BY
ATTORNEYS

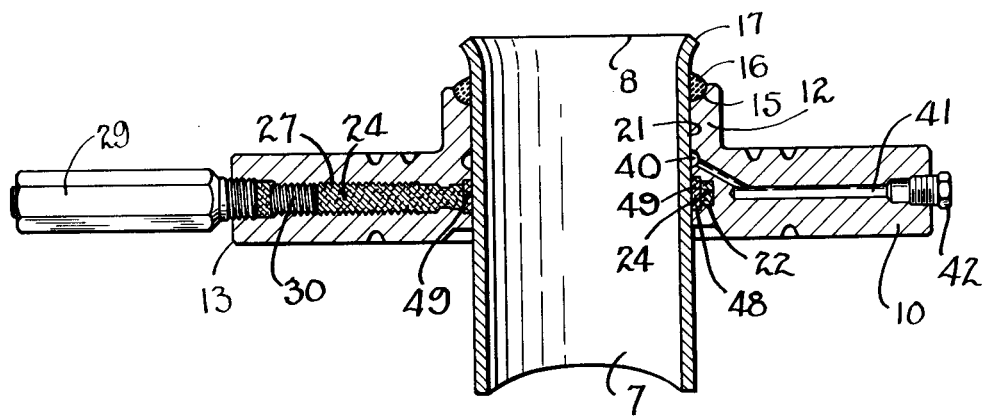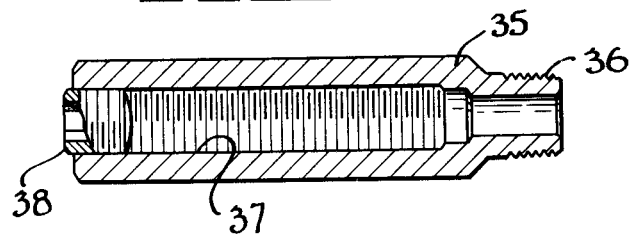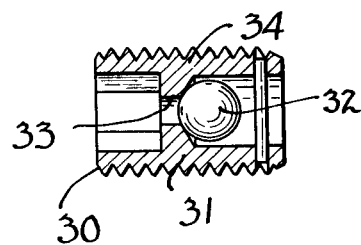
R. N. BEAN
J. S. ABERCROMBIE
HERBERT ALLEN
INVENTORS Patented June 6, 1944

2,350,867

UNITED STATES PATENT OFFICE 2,350,867

SEALING AND TESTING WELL HEAD CONNECTIONS

Ruric N. Bean, James S. Abercrombie, and Herbert Allen, Houston, Tex., assignors to Cameron Iron Works, a corporation Application May 9, 1939, Serial No. 272,578

7 Claims. (Cl. 166—14)

The invention relates to a means and method of sealing and testing well head connections where a string of pipe is to be suspended in the well bore.

In completing wells drilled by the rotary method several strings of pipe may be lowered into the well bore after the drilling operation has been completed, and in order to prevent the pressures in the well bore from displacing the strings of pipe when they are landed the practice has grown up of running the string of pipe into the well and determining the length of such string of pipe. The pipe is then cut off at the desired elevation and the upper end welded to a hold down body or flange which is in turn positioned upon the casing or well head.

The production fittings are then attached above the welded portion and the well is completed. It is very desirable to separate the pressures which are present inside of the production string from that pressure which is on the outside of the production string and inside of the well casing because the higher pressure is usually present in the production string and if the weld leaks this pressure flows down around the outside of the production string and may cause leakage or difficulty in the casing. The present invention, therefore, concerns itself with providing an additional seal about the pipe below the weld on the pipe so as to prevent any such leakage and also has in mind the provision of a method and apparatus for testing the weld after it has been made and while the pipe is suspended in the well so that it may be determined whether or not there is any leakage past the weld and whether a satisfactory weld has been made.

It is one of the objects of the invention to provide a pipe support wherein a string of pipe is welded and sealed above the support.

Another object of the invention is to provide a method and apparatus of applying pressure to a weld at the well head in order to test the weld for leakage.

Another object of the invention is to provide a packing below a weld which seals the pipe after the weld has been made so that the packing is not affected by the heat of the welding operation.

Another object of the invention is to test a weld on a string of pipe by applying pressure to it as the pipe is suspended in the well.

Another object of the invention is to provide a packing held in position below weld in a well head.

Other and further objects of the invention will be readily apparent when the following description is considered in connection with the accompanying drawings wherein:

Fig. 2 shows the attaching body with the pipe welded thereto and illustrates the manner of applying pressure to the seal about the pipe.

Fig. 3 shows a pressure gun for applying pressure to the plastic packing, as shown in Fig. 2.

Fig. 4 shows a check valve which is used in Fig. 2 to prevent the release of the pressure applied to the plastic packing.

Figure 1:
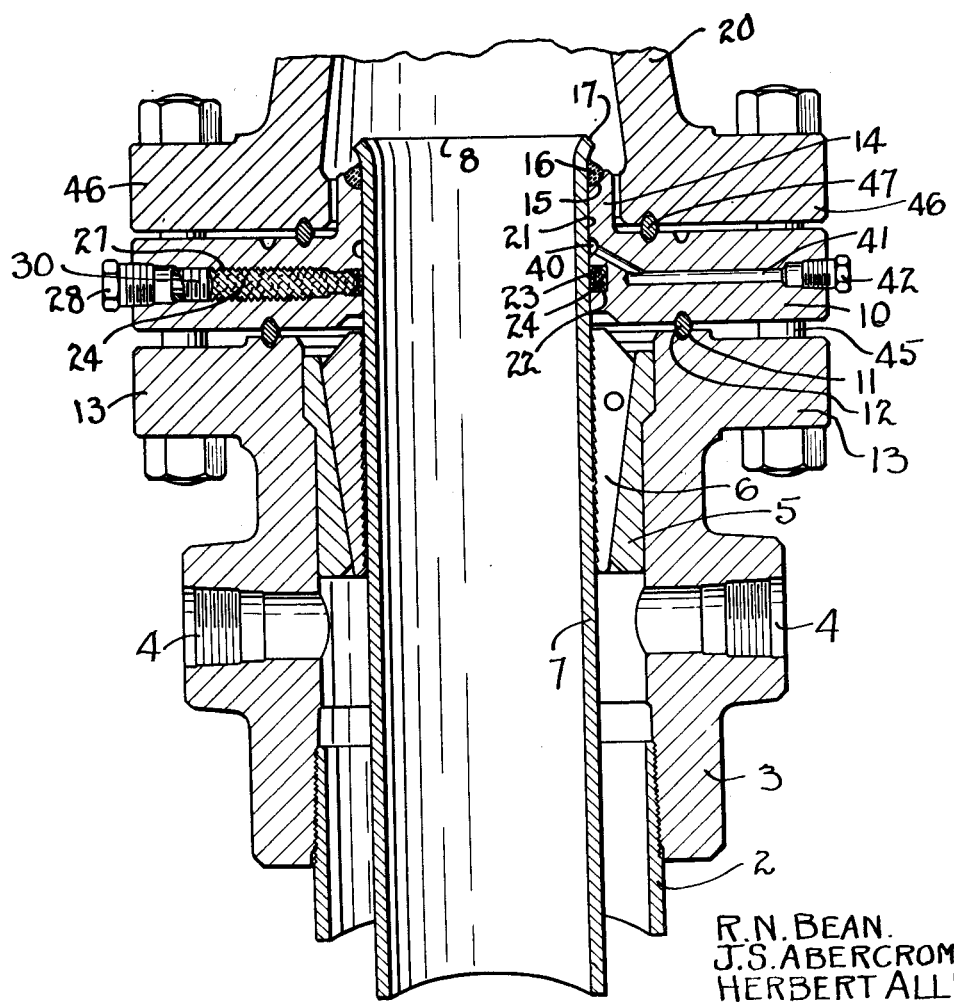
Fig. 1 is a vertical sectional view showing a string of pipe suspended in its supporting structure with the packing about the pipe and with the other fittings in place above the welded connection which is the position of the parts after the well has been completed.

In Fig. 1 the surface casing is indicated generally at 2 and the well head 3 is mounted thereon. The outlets 4 are provided on the casing head and it is arranged to receive an adaptor bushing 5 and a set of slips 6 by which the string of pipe 7 may be supported in the well until it has been properly landed. This string of pipe may be the production string or any subsequent string of pipe such as the tubing which may be run into the well; and the present description is intended to apply to any or several strings of pipe which may be landed in this manner.

The string of pipe 7 is of a suitable length to extend down into the well and the usual practice is to run this pipe into the well by connecting adjacent sections until the desired length is in the well. The pipe is then marked at a point such as 8 at which it is to be cut off, so that the upper end will be at the desired elevation. The pipe is then cut off while suspended by the slips 6. A hold-down or attaching flange or body 10 is then slipped down over the upper end of the pipe. This flange is arranged to contact a metal ring 12 which fits into suitable grooves 11 in the top of the casing head 3 and the bottom of the flange 10.

The flange 10 is preferably bolted to the casing head 3 at this point so that it will be firmly held in place and may be considered as a part thereof. Bolts of a length to pass through the flange 13 of the casing head and the flange 10 will be positioned and the flange drawn down tightly upon the seal ring 12. The flange 10 has an upwardly extending ring portion 14 which may be beveled out at 15 to form a pocket to receive a head of welding material 16. This weld is made at this time and the upper edge 17 of the pipe 7 is then belled outwardly so as to accommodate the insertion and removal of tools or other equipment.

During this operation the other well head fittings such as 20 are not in place and the upper end 17 of the pipe is the top of the assembly at this time.

Particular attention is directed to the construction of the flange or body 10, which is provided with a central opening 21 which fits rather closely about the periphery of the pipe 7. An annular recess 22 is provided in the face of this opening 21 and a packing ring 23, which may be of channel shape of a suitable heat resistant material, such as asbestos, is preferably positioned in this recess. This ring is so positioned before the flange is moved down over the pipe. It should be noted that this ring 23 does not completely fill the recess and that a body of plastic packing 24 can be forced into the recess 22 behind the packing ring 23. As seen in Fig. 1, there is a chamber 27 which extends radially in from the edge of the flange 10. This chamber is closed in Fig. 1 by a suitable plug 28, while in Fig. 2 this plug has been removed and a pressure fitting 29 inserted therein.

This fitting 29 is in the form of a gun to which pressure can be applied in order to apply pressure to a body of plastic packing 24 which is disposed in the chamber. Packing of this sort usually comes in stick or rod form and can be deformed when pressure is applied to it. The pressure may be applied in the form of any suitable lubricant or packing which will flow under pressure applied from the tool 29. In order to prevent the loss of the applied pressure, when the gun 29 is removed and the plug 28 re-inserted a check valve 30 has been screwed into the end of the chamber 27. This check valve is best seen in Fig. 4 and includes a body 31 which carries a ball check valve 32 which closes the passage 33 in the body. The external threads 34 permit the valve to be screwed into the chamber 27. The gun 29, as seen in Fig. 3, includes a body 35, which has external threads 36 to fit into the end of the chamber 27. A passage through the body 35 is internally threaded at 37 to receive the plug 38. This plug can be turned to force lubricant or packing material through the gun as the plug is turned along the threads 37. It seems obvious that when pressure is applied to this plastic packing 24 it will flow inwardly along the chamber 27 and around the recess 22 to completely back up the packing ring 23. Any desired pressure can be applied in this manner to confine the packing ring 23 under pressure and maintain it in sealing position about the periphery of the pipe 7.

One advantage of applying this packing in this manner is that the packing material 24 need not necessarily be present when the weld 16 is being positioned. In some instances the parts become heated to such a temperature that it would melt the packing or otherwise destroy it and it is, therefore, of material advantage to apply this pressure and seal after the weld has been made and after the metal parts have cooled although the order in which the weld and seal are made is not otherwise important and the invention is not limited to applying the seal and making the weld in the order stated.

A packing of this sort just described formed about the pipe below the weld 16 is fluid tight and prevents the flow of pressure along the periphery of the pipe in either direction but is particularly of advantage in preventing any leakage along the pipe through the weld 16.

The arrangement of the packing seal below the weld 16 permits the additional operation of testing the weld 16 for leakage. To accomplish such testing an annular groove 40 has been provided in the face of the opening 21 above the recess 22 and below the weld 16. This groove 40 connects with a passage 41 which extends to the outside of the flange 10 and may be closed with a plug or other fitting 42.

The purpose of the groove 40 and passage 41 is to apply fluid pressure to the groove 40 after the weld has been made and after the packing 24 has been positioned. In this manner fluid pressure in any desired amount can be applied to the area between the packing and the weld for the purpose of testing the weld to determine whether it has been properly made and whether it is subject to leakage. Any suitable fluid or liquid may be applied by attaching a suitable pressure implement in the end of the passage 41 by removing the plug 42. It is only necessary to apply a greater pressure to the packing 24 than is applied in the test in order to prevent leakage past the packing and to subject the weld to the desired pressure.

In practicing the foregoing method it is evident that the weld can be made and properly tested before the rest of the well head fittings such as 20 are applied. When it has been determined that the weld does not leak and is suitably made then the fitting 20 can be applied and the long bolts 45 passed through the flange 46 on the fitting 20, the flange 10, and the flange 13 on the well head. An additional seal ring 47 may be positioned between the flanges 46 and 10 so that the entire assembly will be completely sealed when the bolts 45 are affixed.

Fig. 2 shows a slightly modified form of the recess 22 wherein the recess is enlarged at 48 where it enters the opening 21 and a wide packing ring 49 is positioned therein instead of the channel shaped ring 23. Either form of packing ring may be used.

The invention contemplates that a seal is to be made about either the pipe or the pipe hanger by maintaining the packing ring in sealing position with plastic packing.

Broadly the invention contemplates the provision of a seal about a welded pipe in order to test the weld and provide such packing after the weld has been made or of merely providing a pressure packing about a pipe.

What is claimed is:

1. A well head assembly including a casing head, a member thereon including a flange, a pipe, a weld affixing said pipe in said member, means in said flange spaced from said weld to apply a pressure seal about the periphery of said pipe, and additional means, independent of said pressure seal applying means, to apply fluid under pressure about said pipe between said weld and said seal to test the weld.

2. A well head assembly including a casing head, a member thereon including a flange, a pipe, a weld affixing said pipe in said member, means in said flange spaced from said weld to apply a pressure seal about the periphery of said pipe, and additional means, independent of said pressure seal applying means, to apply fluid under pressure about said pipe between said weld and said seal to test the weld, and a ring of heat resistant material to be forced against the pipe by said pressure seal applying means, 3. A well head assembly including a casing head, a flange member thereon, a seal ring disposed between said head and flange, a string of pipe suspended in said head, the upper end of said pipe projecting thru said flange, a weld affixing the end of the pipe to the top of said flange, a packing ring about said pipe in said flange, a quantity of plastic packing carried by said flange, and means to apply pressure thereto to force said packing against said packing ring to seal about the periphery of the pipe below said weld.

4. A well head assembly including a casing head, a flange member thereon, a seal ring disposed between said head and flange, a string of pipe suspended in said head, the upper end of said pipe projecting thru said flange, a weld affixing the end of the pipe to the top of said flange, a packing ring about said pipe in said flange, a quantity of plastic packing carried by said flange, means to apply pressure thereto to force said packing against said packing ring to seal about the periphery of the pipe below said weld, a groove in said flange about said pipe, and means to apply fluid under pressure to said groove so that such pressure will be confined by said packing ring and weld so that the weld may be thus tested for leakage.

5. A seal for pipe in well head supports including a support member having a central opening to receive the pipe, a recess in the face of such opening, a packing ring in said recess to engage about the pipe, means to apply pressure to the exterior of said ring to force it to seal with the periphery of the pipe including a supply of plastic packing to flow under pressure into said recess behind said ring, and a weld above said seal affixing the pipe to said member.

6. A well head of the character described having a passage therethru to receive a string of pipe, means on said head to form a seal about the pipe, said means including a groove and packing ring therein, and additional means to apply hydraulic pressure to said ring to form a seal about the pipe, said pipe being welded to said first means, and still additional means to apply fluid under pressure between said seal and weld to test the weld for leakage.

7. A support for a pipe at a well head, including a body, an opening therethrough to receive the pipe, means in said opening to seal between said body and the pipe, said means including a part for receiving a weld joining said body and pipe and a lower sealing means to seal between the body and the pipe spaced below the weld, means for introducing fluid under pressure into said opening about said pipe between said weld and lower sealing means to test said weld and sealing means for leakage, and means independent of said last named means for varying the sealing pressure of said lower sealing means against the pipe to stop any leakage past said sealing means.

RURIC N. BEAN.
JAMES S. ABERCROMBIE.
HERBERT ALLEN.